United States Patent
Hamaguchi et al.

(10) Patent No.: US 6,760,172 B1
(45) Date of Patent: Jul. 6, 2004

(54) MAGNETIC DISK DRIVE

(75) Inventors: Takehiko Hamaguchi, Fuchu (JP); Hideki Zaitsu, Kokubunji (JP); Futoshi Tomiyama, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 426 days.

(21) Appl. No.: 09/616,073

(22) Filed: Jul. 13, 2000

(30) Foreign Application Priority Data

Jul. 13, 1999 (JP) ............................................. 11-198597

(51) Int. Cl.[7] ................................................. G11B 5/09
(52) U.S. Cl. .................... 360/48; 360/77.08; 360/78.14
(58) Field of Search ............................... 360/48, 77.08, 360/78.14

(56) References Cited

U.S. PATENT DOCUMENTS 5,661,760 A * 8/1997 Patapoutian et al. ........ 375/341
5,986,847 A * 11/1999 Le et al. .................... 360/78.14
6,396,654 B2 * 5/2002 Jeong et al. ............. 360/77.08
6,469,852 B1 * 10/2002 Nakagawa .................... 360/48

FOREIGN PATENT DOCUMENTS

| JP | 58222468 | 12/1983 |
| JP | 9259554 | 10/1997 |

* cited by examiner

Primary Examiner—David Hudspeth
Assistant Examiner—Glenda Rodriguez
(74) Attorney, Agent, or Firm—Antonelli, Terry, Stout & Kraus, LLP

(57) ABSTRACT

To improve the track density by reducing the discontinuity of servo patterns to be generated by a servo track writer, some servo areas existing in one circuit of a magnetic disk are formed at the consecutive first and second circuits of a servo track writer by averaging a plurality of position signals detected from servo patterns at the first and second circuits of the magnetic disk.

14 Claims, 17 Drawing Sheets

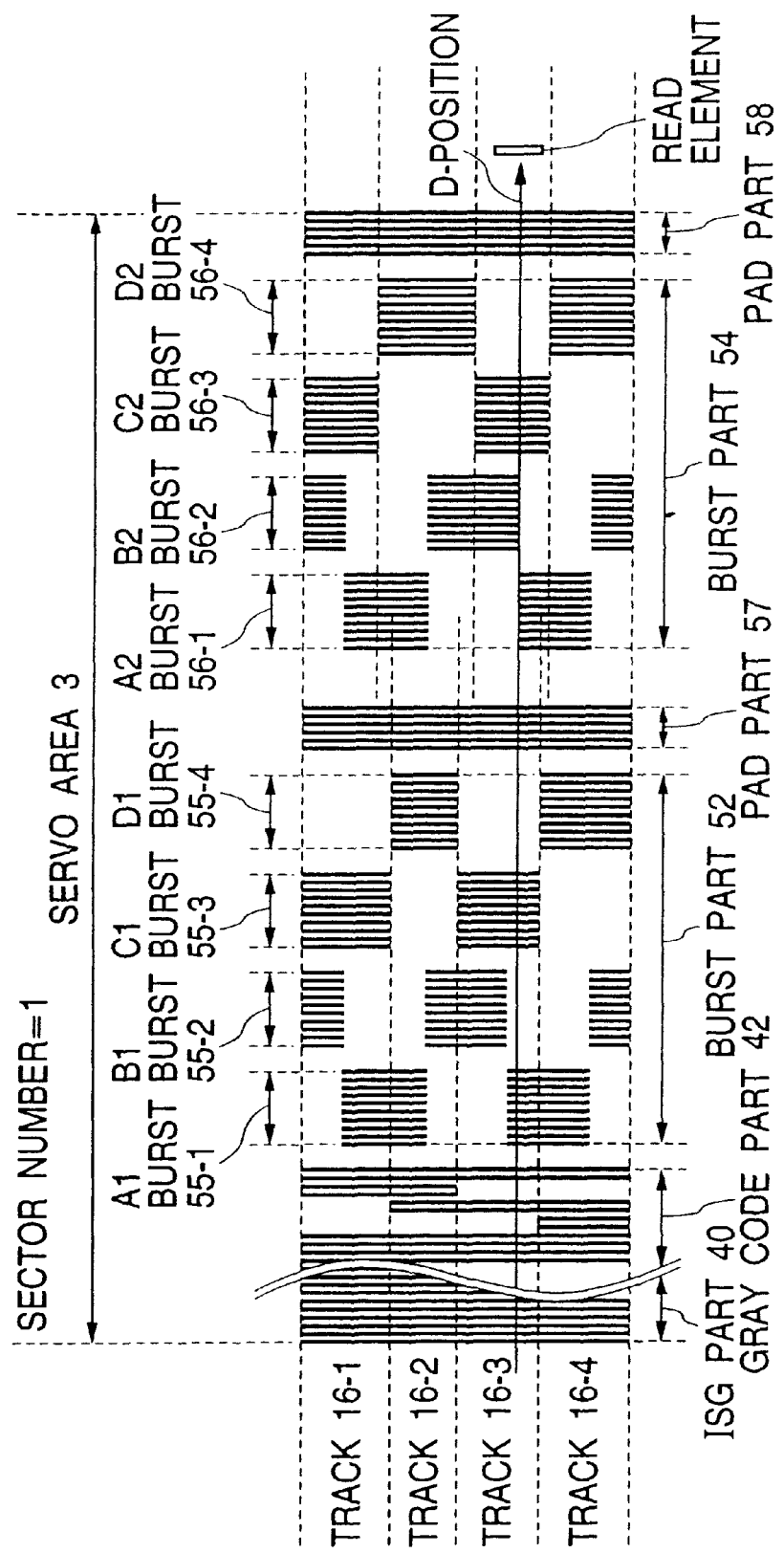

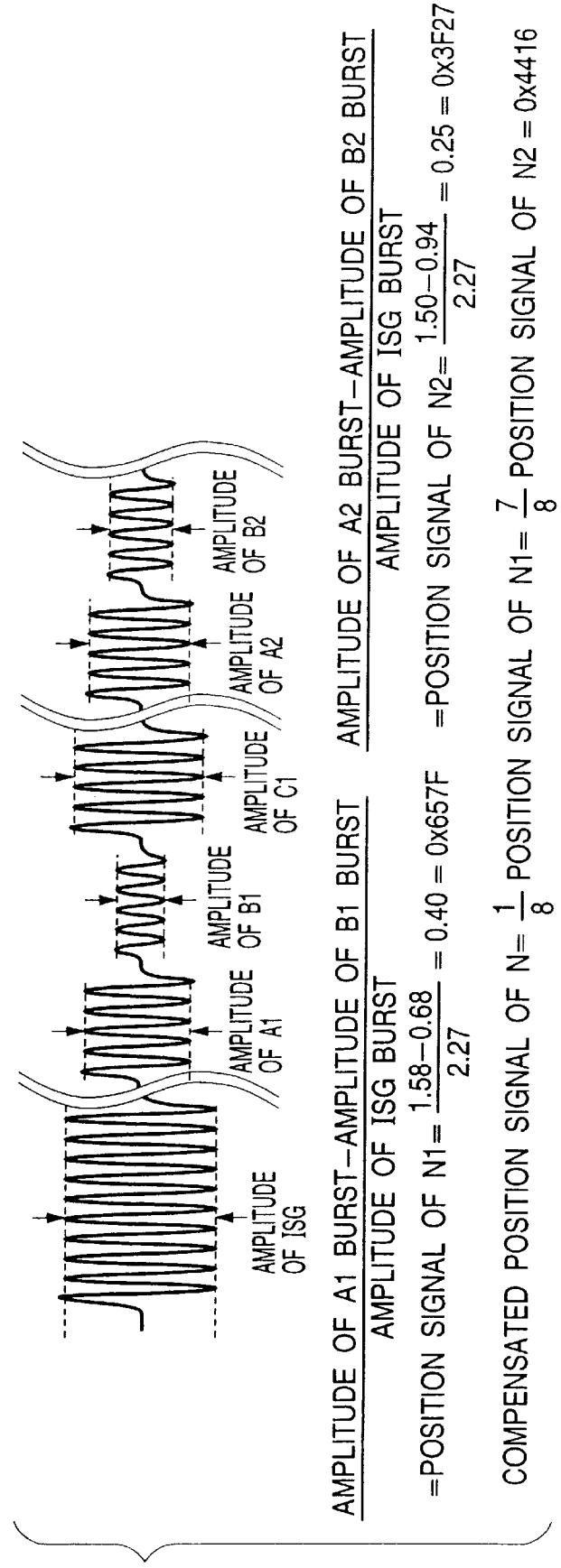

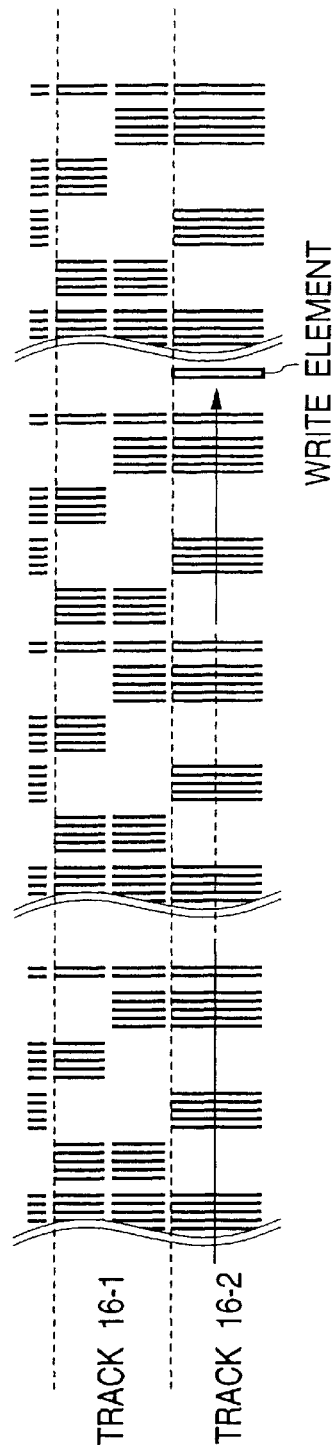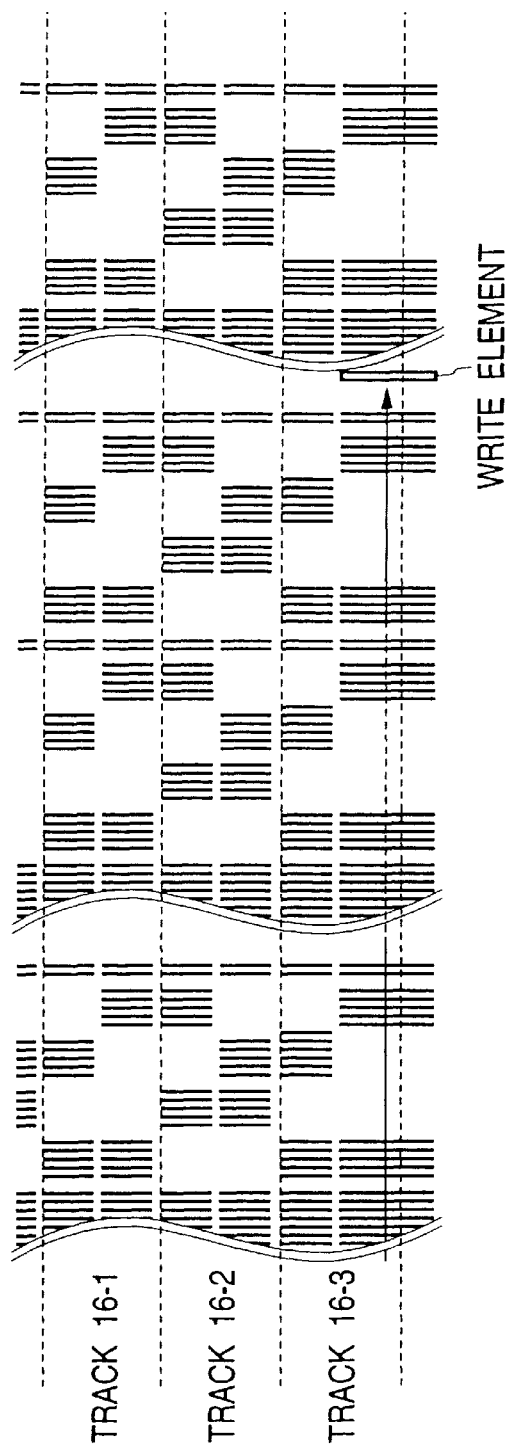

| SECTOR NUMBER | POSITION SIGNAL OF N1 | POSITION SIGNAL OF N2 | COMPENSATED COEFFICIENT OF N1 | COMPENSATED COEFFICIENT OF N2 | POSITION SIGNAL OF N* |
|---|---|---|---|---|---|
| .. | .. | — | .. | .. | .. |
| 71 | 0x4EZD | — | 8/8 | 0/8 | 0x4EZD |
| 72 | 0x428E | — | 8/8 | 0/8 | 0x428E |
| 1 | 0x657F | 0x3F27 | 1/8 | 7/8 | 0x4416 |
| 2 | 0x5E19 | 0x4567 | 2/8 | 6/8 | 0x4894 |
| 3 | 0x6441 | 0x5871 | 3/8 | 5/8 | 0x5CDF |
| 4 | 0x5FC6 | 0x53F3 | 4/8 | 4/8 | 0x59DC |
| 5 | 0x571A | 0x4D42 | 5/8 | 3/8 | 0x5369 |
| 6 | 0x4FB9 | 0x549A | 6/8 | 2/8 | 0x50F1 |
| 7 | 0x4E48 | 0x584E | 7/8 | 1/8 | 0x4F89 |
| 8 | 0x46D9 | — | 8/8 | 0/8 | 0x46D9 |
| 9 | 0x48E4 | — | 8/8 | 0/8 | 0x48E4 |
| .. | .. | — | .. | .. | .. |

SERVO AREA INCLUDING MORE BURST

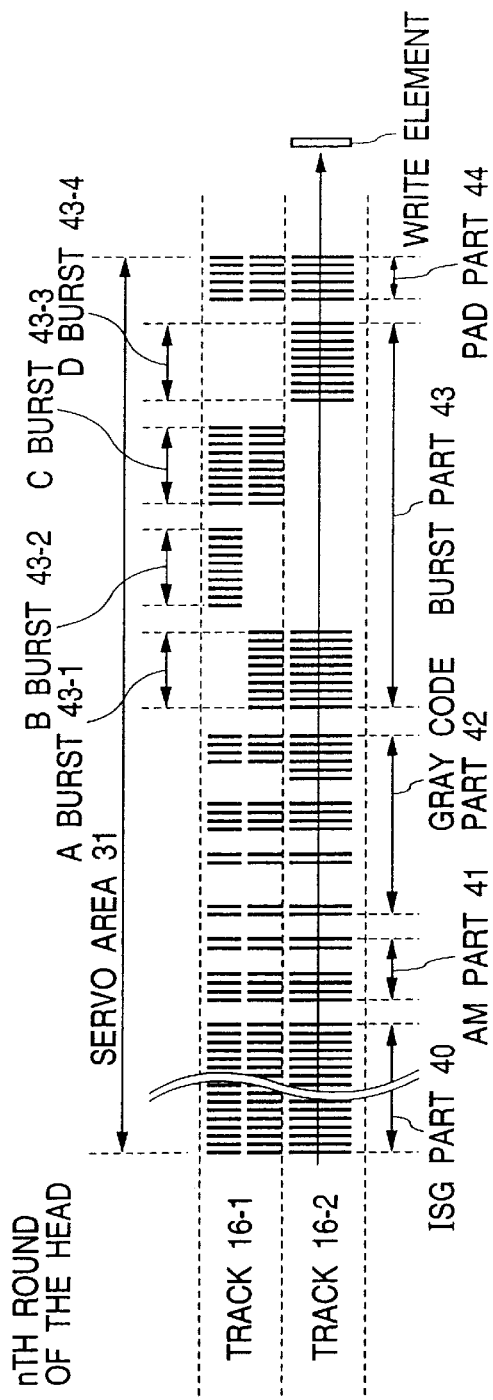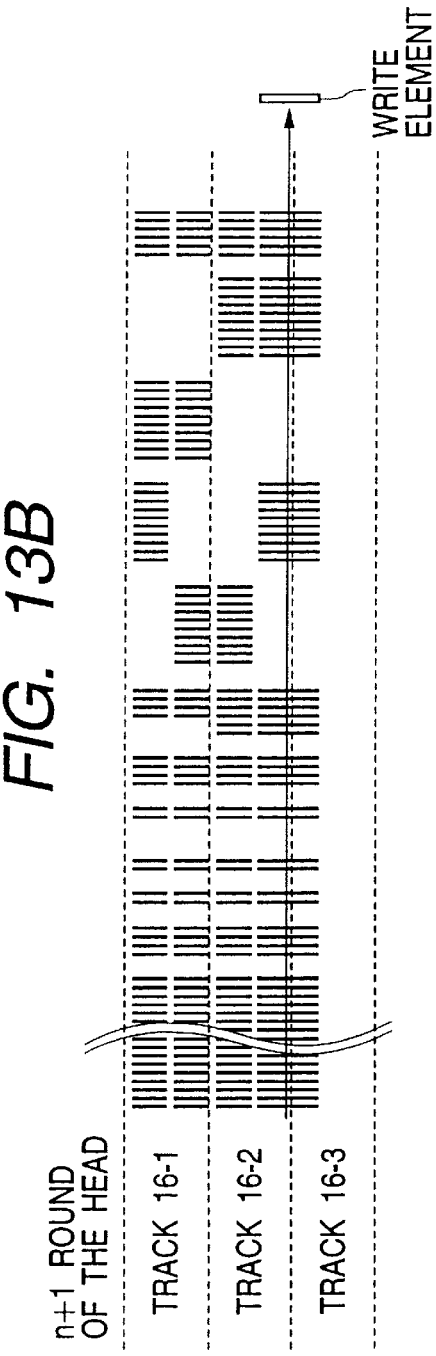

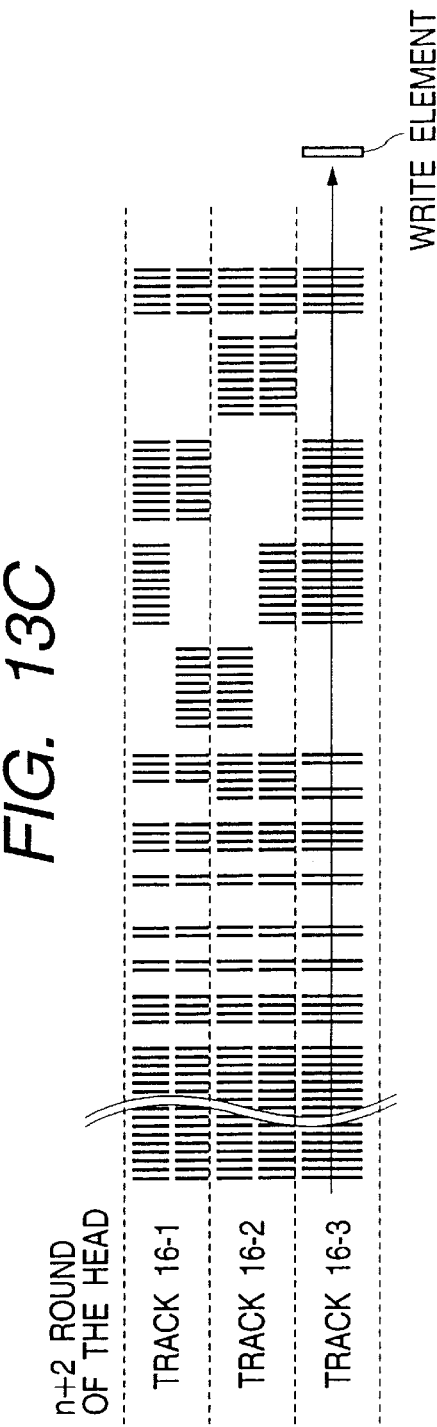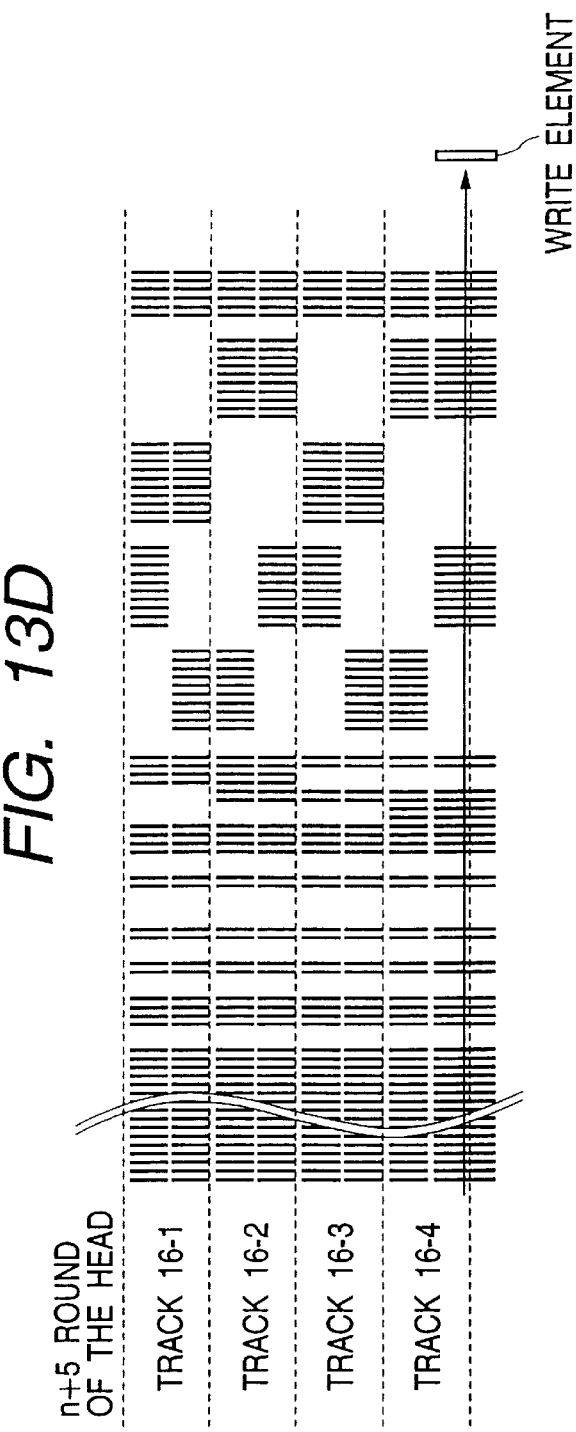

MAGNETIC DISK DRIVE

BACKGROUND OF THE INVENTION

The present invention relates to an information recording apparatus provided with a magnetic head and a magnetic disk; and, more particularly, the invention relates to a magnetic disk drive whose track density is significantly improved.

A magnetic disk drive positions its head by use of a rotary actuator on a magnetic disk rotated by a spindle motor, thereby recording/reproducing information magnetically from/on many tracks formed on the magnetic disk concentrically. In order to follow a target data track, it is required to precisely measure the relative position between each head and the magnetic disk, thereby reducing any misalignment caused by a difference in thermal expansion, as well as the influence of such disturbances as the vibration of the spindle motor and the vibration rotary actuator during rotation. The information which indicates the relative position between the head and the magnetic disk is provided in the form of a head position signal. It is essential to produce this head position signal as accurately as possible so as to improve the track density. To achieve this object, there is a technique employed widely, as disclosed in Japanese Patent Prepublication No. 58-222468. The technique obtains the head position signal from each shipment pattern written on the magnetic disk before the delivery of the magnetic disk drive. The special pattern is referred to as a servo pattern.

FIGS. 13A to 13D show how a servo pattern is formed up in a servo area 31 with use of a servo track writer. The servo track writer, as disclosed, for example, in Japanese Patent Prepublication No. 64-48276, is used to write tracks at equal pitches on a magnetic disk. In this case, a description will be given of a conventional technique that has been employed widely; wherein, one track is divided into two so as to write a servo pattern therein respectively.

How servo patterns are written in three consecutive tracks on the magnetic disk sequentially is shown in FIGS. 13A, 13B, 13C, and 13D. Usually, because the core width of the write element of the magnetic head is wider than a half of a track, a servo pattern becomes wider than the target track just after the pattern writing. For example, the width of the servo pattern newly written in track 16-2 in FIG. 13A is wider than the width of the servo pattern written in the track 16-1. Following this process, a servo pattern written at the previous rotation of the magnetic disk is erased at one side before another servo pattern is written as shown in FIGS. 13B and 13C.

Then, as shown in FIG. 14A, after the magnetic disk is rotated several times, four patterns from A burst 43-1 to D burst 43-4 are formed into the same width as that of one track. An ISG part 40 and an AM (Address Mark) part 41 are formed as consecutive patterns in the track width direction. When a servo pattern is written actually, it needs a time for moving the head only by a half of the track pitch in the track width direction. In the case of a method of rotating the magnetic disk idly once between the states in the charts 13A and 13B, 13B and 13C, and 13C and 13D, respectively, servo patterns are written in the servo areas of one track while the magnetic disk is rotated twice.

FIGS. 14B and 14C show how a head position signal is generated from a servo pattern formed in the servo area 31. In the pattern shown in FIG. 14A, the ISG part 40 is a continuous pattern formed so as to reduce the influence of the magnetic irregularities of the medium or the fluctuation of the flying height of the magnetic disk. A servo decoder block activates an auto gain control (AGC) so as to reproduce the ISG part 40. The AGC is turned off when the AM part 41 is detected, thereby providing a function for normalizing the following reproduced width of the following burst part 43 at an amplitude of the ISG part 40. A Gray code part 42 describes the track number of each track 16 with a Gray code. In this part there is often described sector number information, as well. The burst part 43 is formed as a checker-like pattern so as to obtain accurate information on the target position in the radial direction of the magnetic disk. It is necessary for the head to follow the center of each track accurately. This pattern is formed so that the center between A burst 43-1 and B burst 43-2 or between C burst 43-3 and D burst 43-4 is aligned with the center of each track 16. A pad part 44 is formed so as to absorb the delay of the decoder block system so that clock generation is maintained, while the servo decoder block reproduces the servo area 31.

The head 11 provided with a read element reproduces servo patterns while running on the position A from left to right as shown in FIG. 14A. FIG. 14B shows an example of the reproduced waveform at this time. The reproduced waveforms of the AM part 41, the Gray code part 42, and the pad part 44 are omitted here so as to simplify the description. The servo decoder block detects the amplitudes of the four bursts from A burst 43-1 to D burst 43-4. The amplitude of each burst is converted to a digital value by an A/D converter and transferred to a CPU. The CPU calculates the difference between amplitudes of the A burst 43-1 and the B burst 43-2, thereby calculating a position signal N. In FIGS. 14A–14C, expressions are also shown. Each expression normalizes such a difference between amplitudes with the ISG amplitude.

To provide this function of normalization, the servo decoder block controls the AGC so as to fix the amplitude of the ISG 40. In the same way, the Q position signal is calculated from the difference of amplitude between the C burst 43-3 and the D burst 43-4.

FIG. 14C shows a head position signal generated as described above. The position signal N becomes 0 at position B where the center of the head is positioned at equal distances to both the A burst 43-1 and the B burst 43-2. The N position signal is switched between positive and negative in proportion to the misalignment distance from this center position. For example, the position signal N is obtained from the reproduced waveform of the position C shown in FIG. 14A at the position C shown in FIG. 14C. The CPU compares the absolute value of the position signal N with the absolute value of the position signal Q, thereby inverting the positive/negative states of those position signals N and Q and linking them so as to generate continuous position signals, respectively. In many servo patterns, the position where the position signal N becomes 0 is set as a following center, thereby controlling the voice coil motor for driving the head. If there is no misalignment between the write element and the read element in the track width direction, the edge of each of A burst 43-1 and B burst 43-2 is aligned to the center of each track 16.

The use of the above conventional technique can therefore reduce the misalignment caused by the difference in thermal expansion, as well as the influence of such disturbance as the vibration of the spindle motor and the rotary actuator during rotation. Consequently, the accuracy of following each target data track can be improved, thereby further improving the track density.

However, the above conventional technique has an inherent a problem; that is, when a servo area is written with use of a servo track writer, the vibration of the servo track writer is fixed on the magnetic disk as a difference in position between servo patterns in servo areas. In particular, because the non-repeatable run-out that does not depend on the rotational position of the disk adds up error components that are different among tracks, there is no effective method for removing the non-repeatable run-out. Because a servo area, once it is formed, cannot be rewritten after the shipment of the magnetic disk drive, the head comes to follow servo patterns in each of which error components are added up. According to a technique disclosed in Japanese Patent Prepublication No. 9-35225, it is possible to effectively compensate such error components of the position signal, which is synchronized with the rotation of the object disk. However, the technique still has other problems; for example, a productivity problem occurs in that a long time is needed to create compensatory data and write the data, and an efficiency problem occurs in that formatting of the drive is not done so efficiently, since a second data area is necessary for the above compensatory data in this case.

There is also another problem in that the end of a written servo area is not aligned to the start of another servo area written during the previous rotation of the disk. This problem is caused by the non-repeatable run-out of the servo track writer.

FIG. 8A shows the position signal of N decoded from a servo area consisting of sectors 1 to 72, which is equivalent to one round of the magnetic disk. The vertical axis in FIG. 8A denotes hexadecimal data fetched by the CPU, which is proportional to a distance. The center of each track is set to 0x5000.

FIG. 8A shows an example of the writing of a servo pattern in a servo area, started at sector 1, so as to simplify the description. A space between sectors 72 and 1 in the center part in FIG. 8A is a discontinued portion where the above misalignment occurs. When a servo area is written, such a discontinued portion is always formed once per revolution of the disk, thereby a discontinuity is generated in the decoded head position signal. Just after such a discontinuity in this position signal, an error position signal, which denotes a difference between a target position signal and an observed position signal, becomes large, making it difficult to control the head accurately in the radial direction. When the accuracy of head positioning is degraded, an interference occurs between a target track data area and an adjacent track data area, whereby the error rate is poor/inferior. Accordingly, the reliability of the magnetic disk drive is lowered. This is also a problem arising from the conventional technique.

According to a technique disclosed in Japanese Patent Prepublication No. 9-259554, a servo signal is written so as to compensate a misalignment on the object magnetic disk, whereby it can be expected to effectively compress error components of a position signal. In this case, however, because there is no compensatory device used for written servo areas, it cannot remove error components caused by the vibration component peculiar to the write head of the servo track writer and the uneven surface of the magnetic disk. This is also a problem that has not been solved by the above conventional technique. In this specification, this discontinued portion generated between the start of a written servo area and the end of another written servo area (i.e. discontinued point formed once per round at an index) will be referred to as a knot in a servo pattern.

In addition, each of many magnetic disk drives are provided with a function to stop the write operation if the head goes far out of a target track due to an external shock, or the like during a write operation. This is to prevent adjacent tracks from overwriting. This function makes it possible to use a method employed widely for stopping a write operation on the basis of a decision that an external shock has been applied to the object disk if an error position signal, which denotes a difference between a target position signal and an observed position signal, becomes larger than a predetermined threshold. However, because such an error position signal adds up various error factors caused by the servo track writer, the signal cannot satisfy a required accuracy of detection as a reference signal to stop the write operation. In particular, because the error position signal has a large value at a knot in a servo pattern, the write operation is stopped even during a normal following operation in which no external shock is applied to the disk. Accordingly, the performance of the magnetic disk drive in such a write operation is lowered. This has also been a problem arising from the above conventional technique.

This is why a new technique has been sought to improve the accuracy in positioning by compensating the error in servo areas, caused by the non-repeatable run-out of the servo track writer in a magnetic disk drive that decodes the head position signal from each of those servo areas, thereby improving the data track density, preventing adjacent tracks from fatal errors of overwriting, and improving the reliability of the magnetic disk drive. Under such circumstances, it is an object of the present invention to provide a magnetic disk drive that can meet these requirements.

BRIEF SUMMARY OF THE INVENTION

In order to achieve the above object, the magnetic disk drive of the present invention forms one of a plurality of servo areas as a servo area having more burst parts than other servo areas on the object magnetic disk. The number of such burst parts is expressed in, for example, a servo address mark. In addition, a plurality of such burst parts are separated from each another by a pattern different from the address mark or by a gap, thereby making it easier to detect each burst part.

A servo track writer used to write servo areas on each magnetic disk in the magnetic disk drive starts writing in a servo area having more burst parts than other servo areas during the first rotation of the disk, and maintains the writing by appending in some burst parts in the servo area having more burst parts than other servo areas at the second rotation of the disk. When decoding the head position signal from the servo area having more burst parts than other servo areas, an averaging processing is executed for the head position signals decoded from the burst parts written at the first rotation of the disk and decoded from the burst parts at the second rotation of the disk. At this time, it is preferable to vary the weighing coefficient of the averaging processing in each servo area.

Concretely, the magnetic disk drive of the present invention is provided with a magnetic disk having a plurality of servo areas and a servo decoder block for decoding the head position signal from those servo areas. The magnetic disk drive of the present invention is characterized in that one of those servo areas is formed so as to have more burst parts than other servo areas. The servo area having more burst parts than other servo areas includes a burst part (n+1) written by the servo track writer at the n-th rotation of the disk (n: a positive integer) and a burst part written at the (n+1)th rotation.

The burst part in the servo area having more burst parts than other servo areas can be divided into a plurality of groups separated with a pattern or a gap therebetween, respectively. A pattern for separating a burst part into a plurality of groups can be a pattern different from a servo address mark.

A servo area can be formed so as to have a servo address mark whose pattern is varied according to the number of included burst parts.

The number of servo areas having more burst parts than other servo areas respectively should preferably be a number obtained by subtracting one from a multiplier of 2.

The servo decoder block, after decoding the head position signals from a servo area including more burst parts than other servo areas, averages a plurality of position signals decoded from those burst parts. In this averaging processing, it is preferable to vary the weighing coefficient of the averaging processing for a plurality of position signals in each servo area, thereby connecting those head position signals smoothly at the knot in the servo pattern.

The magnetic disk drive of the present invention has a plurality of data areas formed separately in a plurality of tracks in the radial direction and a plurality of servo areas formed separately in the circumferential direction. The magnetic disk drive also has a servo decoder block for decoding the head position signal from each of the servo areas. Each of those separated servo areas is formed by combining the first servo area with the second servo area having more burst parts than the first servo area.

Furthermore, the magnetic disk drive of the present invention is provided with a magnetic disk having a plurality of servo areas separated by a plurality of data areas respectively in the circumferential direction and a servo decoder block for decoding the head position signal from each of those servo areas. In the magnetic disk drive, each of a plurality of servo areas has a burst part and one of those servo areas has duplicated burst parts.

The magnetic disk drive of the present invention is provided with a magnetic disk having a plurality of servo areas separated by a plurality of data areas respectively in the circumferential direction and a servo decoder block for decoding the head position signal from each of those servo areas, and each of those servo areas has a burst part and one of those servo areas has another burst part in addition to the above burst part.

The magnetic disk drive of the present invention also has a plurality of data areas formed in a plurality of tracks in the radial direction and a plurality of servo areas formed in the circumferential direction of the magnetic disk respectively and a servo decoder block for decoding the head position signal from each of those servo areas. In the magnetic disk drive, the servo decoder block is provided with a function for connecting the head position signals smoothly at each knot in the servo pattern. The knot appears once per rotation of the disk when the servo track writer writes servo areas on the disk.

Furthermore, the magnetic disk drive of the present invention is provided with a head having a write element and a read element, a magnetic disk having a plurality of servo areas including a burst pattern respectively for generating a signal depending on the positional relationship between each of the tracks formed concentrically and the head, and a servo decoder block for generating a signal representing the positional relationship between each of the tracks and the head according to a reproduced signal from the burst pattern through the head. In the magnetic disk drive, the servo areas are divided into a plurality of types, in each of which the number of burst patterns is varied from others in the circumferential direction.

The magnetic disk drive of the present invention is also provided with a head having a write element and a read element, a magnetic disk with a plurality of servo areas including a burst pattern for locating the center of each of a plurality of concentric tracks, and a servo decoder block for generating a signal representing the positional relationship between the center of each track and the head according to the reproduced signal for each burst pattern through the head. In the magnetic disk drive, the servo areas are divided into a plurality of types, in each of which the number of burst patterns is varied from others in the circumferential direction.

The above servo areas can be divided into two types; one type having one set of burst patterns written in the circumferential direction and the other type having two sets of burst patterns written in the circumferential direction. Each burst pattern determines the center of each track. Servo areas having more burst patterns in the circumferential direction respectively than other servo areas can exist adjacent to each another.

According to the present invention, therefore, it is possible to improve a reliability of the magnetic disk drive and the track density, since the highly continuous head position signal is followed, thereby improving the accuracy of adjacent track pitches. In addition, it is possible to obtain a high reliability for the magnetic disk drive and improve the access performance of the magnetic disk drive, since misdetection in each discontinuous point of the head position signal is reduced when an external shock is detected with use of the head position signal.

BRIEF DESCRIPTION OF THE SEVERAL VIEWS OF THE DRAWING

FIG. 6A is a diagram of a servo pattern, and FIG. 6B is a diagram of a position signal calculated from a reproduced waveform of the servo pattern.

FIGS. 7A to 7E are diagrams of steps of the process of forming the servo pattern of the present invention.

FIGS. 13A to 13D are diagrams which show steps in the process of forming a conventional servo pattern.

DETAILED DESCRIPTION OF THE PREFERRED EMBODIMENTS

Hereunder, the preferred embodiments of the present invention will be described with reference to the accompanying drawings.

Figure 1:
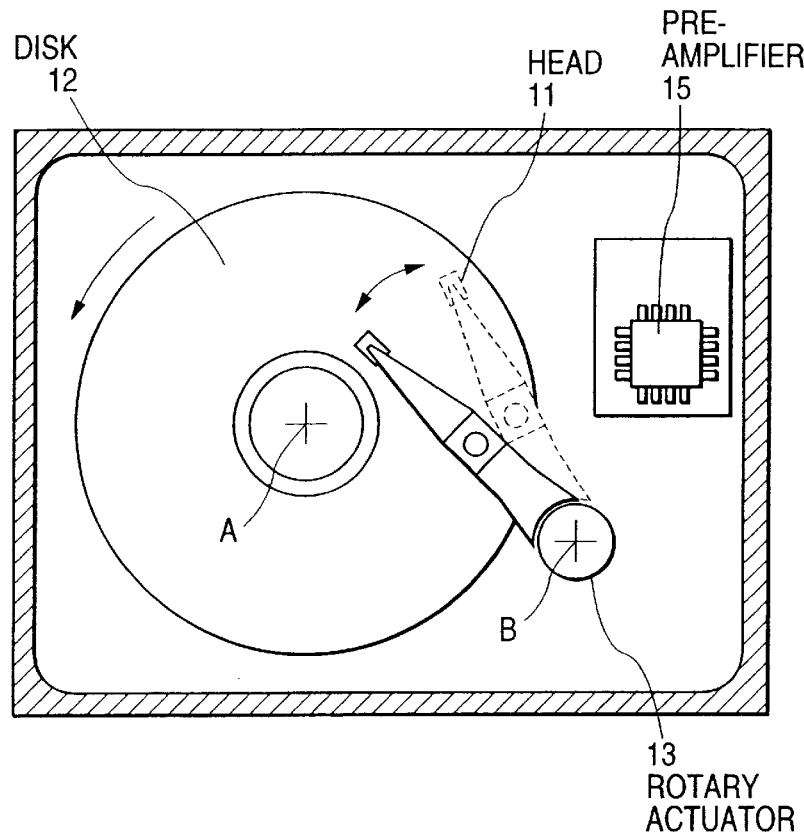
FIG. 1 is a schematic top view of a magnetic disk drive.
Figure 2:
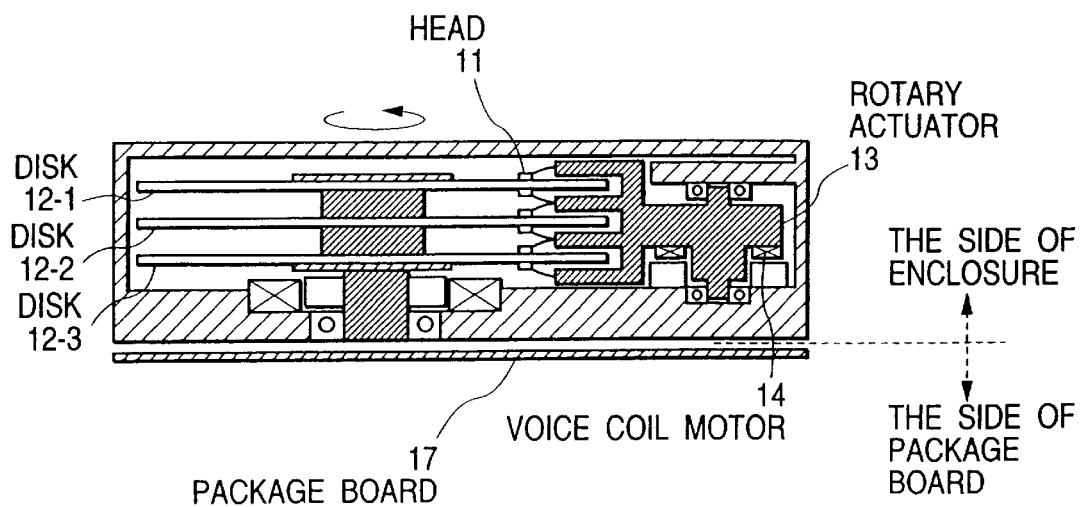
FIG. 2 is a schematic cross sectional view of the magnetic disk drive.

FIG. 1 is a top view of the inside of an enclosure of a magnetic disk drive. FIG. 2 is a cross sectional view of the magnetic disk drive.

The main components of the magnetic disk drive, as shown in FIGS. 1 and 2, are a plurality of heads 11, a plurality of magnetic disks (usually) 12, a rotary actuator 13, a voice coil motor 14, a pre-amplifier 15, a package board 17, etc. A plurality of the magnetic disks 12 are fixed to one rotary shaft, and they are rotated around the shaft A by a spindle motor. A plurality of heads 11 are fixed to one comb-like arm and rotated around the shaft B by the rotary actuator 13. With the mechanism employed for the magnetic disk drive, each of the heads 11 can move freely in the radial direction of the corresponding magnetic disk. On the package board 17 there are mounted a central processing unit (CPU) for overall control, a hard disk controller (HDC), an interface block, a memory, a signal processing block, etc. The pre-amplifier 15 is disposed around the heads 11, since it functions favorably to improve the S/N ratio and the transfer rate. Therefore, it is not packaged on the package board 17, but it is often packaged inside the enclosure.

Figure 3:
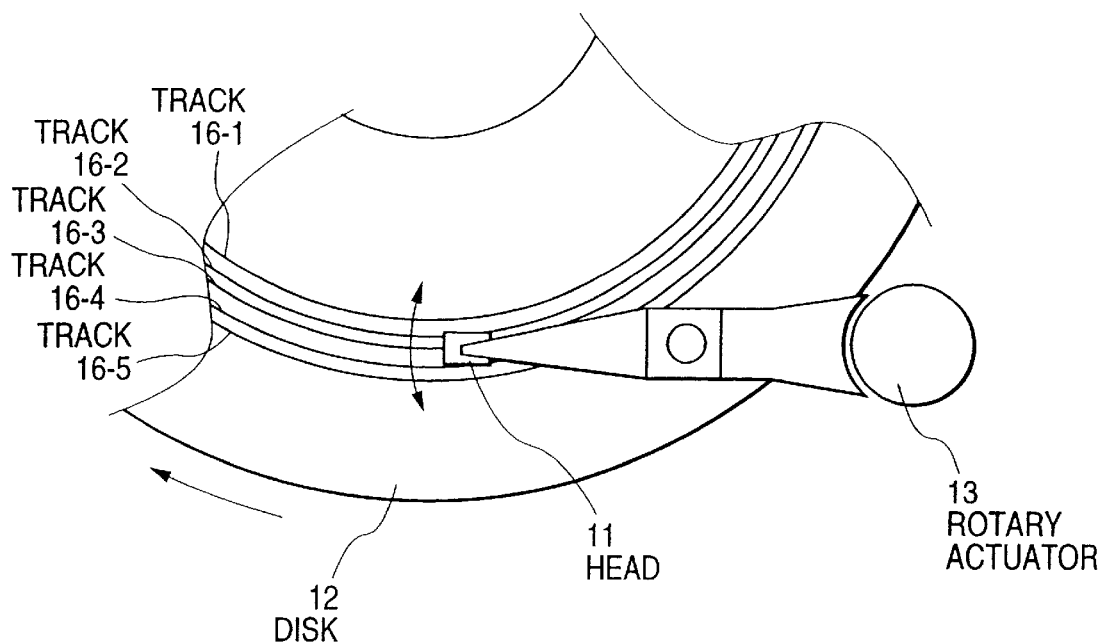
FIG. 3 is a partial top view of the magnetic disk drive.

FIG. 3 is a bottom view of part of the magnetic disk 12. Each head 11 is fixed by the rotary actuator 13 in the radial direction of any of the data tracks 16-1, 16-2, . . . on a corresponding magnetic disk 12 so as to write/read information electrically. Data tracks 16 are formed concentrically at almost equal pitches. In FIG. 3, only five data tracks 16-1 to 16-5 are shown in an explanatory view. Actually, however, more than 15,000 data tracks 16 are formed on a magnetic disk at 1.0 um or narrower pitches.

Figure 4:
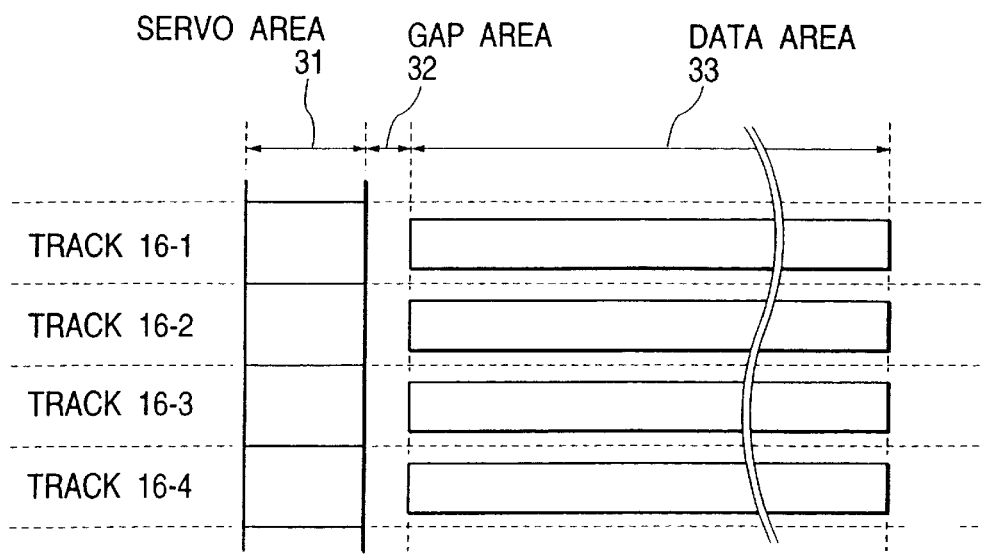
FIG. 4 is a diagram showing a sector structure of a magnetic disk.

FIG. 4 is an explanatory view of a sector structure formed in the magnetic disk drive. Usually, a minimum unit is set for an amount of data to be transferred so as to reduce the load of the I/O processings of data between a magnetic disk drive and a computer. This minimum unit is referred to as a sector. Usually, a sector is determined as a capacity of such a multiplier of 2, like 256, 512, 1024, 2048 bytes, . . . . Data written on a magnetic disk is often blocked in sectors as denoted by data areas 33. A servo pattern is formed in a portion shown as a servo area 31 in FIG. 4 with a gap area 32 therebetween. The gap area functions to absorb a rotation speed fluctuation between data areas 33. The servo area 31 is never updated after the delivery of the magnetic disk drive. It is different from a data area 33 where user data is to be written. Usually, in the track of one circuit of the magnetic disk 12 there are formed 50 to 100 servo areas 31 at equal pitches. The servo areas 31 are formed as patterns whose bit positions are continuous between adjacent tracks 16 in the radial direction while data areas 31 are separated from each other between tracks. A device referred to as a servo track writer is used to form such servo patterns.

Figure 5:
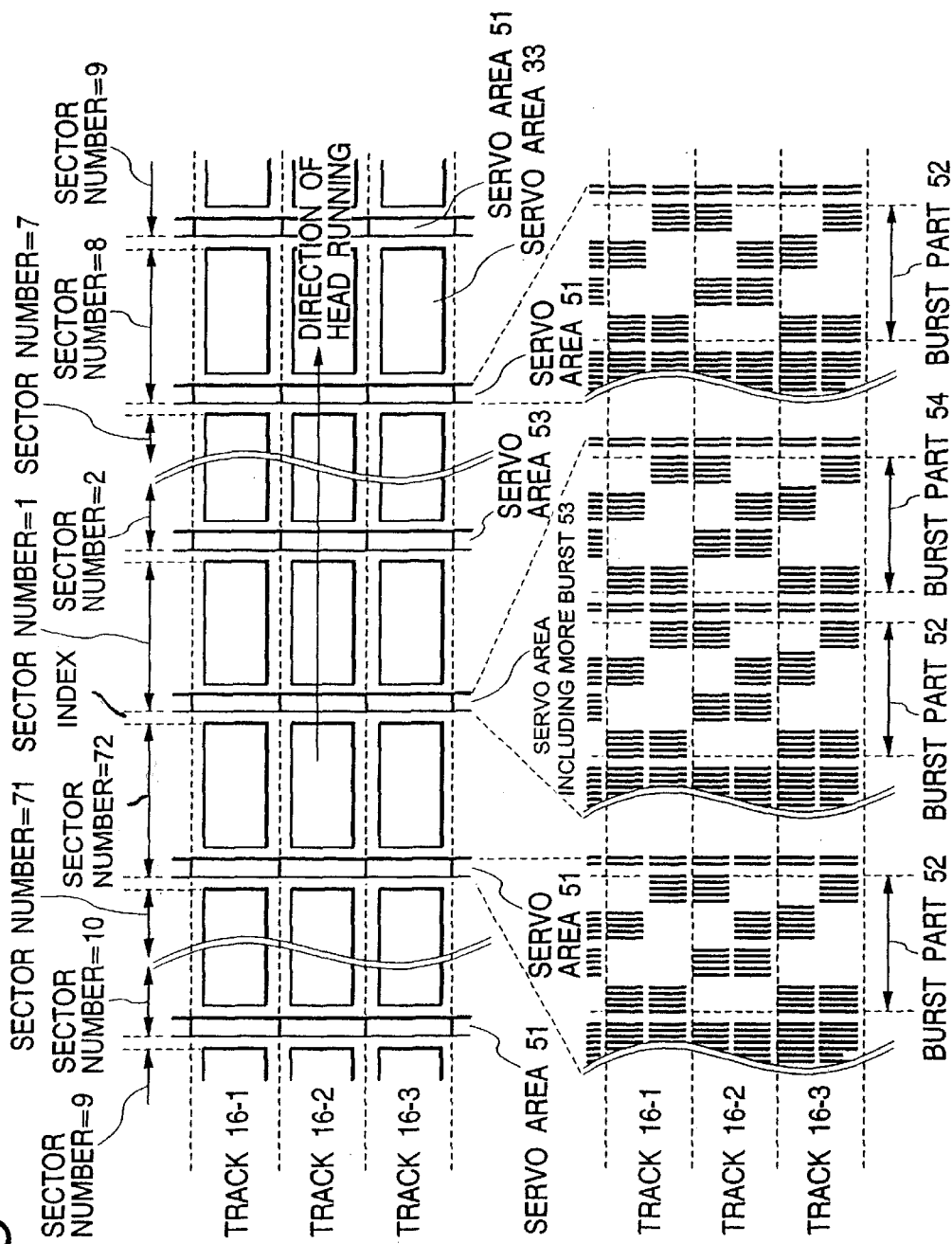
FIG. 5 is a diagram showing a servo pattern according to the present invention.

FIG. 5 shows a configuration of the servo area according to the present invention. In FIG. 5, the circumferential direction of the magnetic disk 12 is shown horizontally and the radial direction of the magnetic disk 12 is shown vertically. The head 11 moves in the direction of head running shown with an arrow at a relative speed of 6 to 11 m/sec with respect to the magnetic disk 12. In FIG. 5, an area of sector 9 is duplicated at both ends. This is because a pattern of one circuit formed in the circumferential direction of the magnetic disk 12 is spread linearly. The areas of sector 9 at both ends are thus one and the same area originally.

In FIG. 5, there are two types of servo areas; areas 51 and 53. The servo area 51 is formed almost in the same way as that of the servo area 31 shown in FIG. 13A, which illustrates in the conventional technique. The magnetic disk drive composed as described above has 72 servo areas per circuit of the magnetic disk 12. Those 72 servo areas are disposed at equal pitches. The track pitch for separating each track 16 from another is about 1.2 um.

Just like the servo area of the conventional technique, each servo area 51 has a burst part 52 consisting of four burst patterns (A burst to D burst). Each servo area 53 has the first and second burst parts 52 and 54. The first burst part 52 is the same as the burst part of the servo area 51. In this embodiment, both burst parts 52 and 54 are similar in pattern structure. A pad part and a gap part are formed between the first burst part 52 and the second burst part 54. The pad part is the same as the pad part 44 described in the conventional technique. The gap area functions to absorb a rotation speed fluctuation of the magnetic disk 12, which occurs in writing of the second burst part. Of the 72 servo areas formed in one circuit of the magnetic disk 12, seven servo areas whose sector numbers are 1 to 7 are structured as the servo area 53 having the second burst part 54, respectively. The other 65 servo areas whose sector numbers are 8 to 72 are structured as the servo area 51 having only one burst part 52, respectively.

Next, the structure of the servo area 53 will be described more in detail with reference to FIG. 6A. The servo area 53 has an ISG part 40, which functions to adjust the gain so as to reduce the influence of an output fluctuation to be caused by the magnetic irregularity of the medium or the fluctuation of the flying height of the magnetic disk 12, an AM part 41 formed so as to detect an initial position of subsequent bit detections with each another, and a Gray code part 42 formed to describe each track information. Each of the above parts functions just like the servo area 31 described in the conventional technique with reference to FIGS. 13A–13D and 14A–14C, so it is partially omitted here. The functions of both pad parts 57 and 58 are also the same as that of the pad part 44 of the servo area 31. The servo area 53 has four burst patterns (A1 burst 55-1 to D1 burst 55-4) as the first burst parts and a burst part 54 as the second burst part. In this embodiment, it is assumed that both burst parts 52 and 54 are structured similarly. As described above, a pad part and a gap area are formed between the first burst part 52 and the second burst part 54. The pad part is the same as the pad part 44 described in the conventional technique, and the gap area functions to absorb a rotation speed fluctuation of the magnetic disk which occurs in writing of the second burst part. Of the 72 servo areas formed in one circuit of the magnetic disk 12, the seven servo areas whose sector numbers 1 to 7 are structured as the servo area 53 having the second burst part 54, and the other 65 servo areas whose sector numbers are 8 to 72 are structured as the servo area 51 having only one burst part 52.

FIG. 6B shows a method for generating position signals N1 and N2 from each of these two pairs of burst parts, respectively. The CPU calculates the difference of amplitude between A1 burst 55-1 and B1 burst 55-2 of the burst part 52, thereby calculating the position signal N1. The CPU also calculates the difference of amplitude between A2 burst 56-1 and B2 burst 56-2 of the burst part 54, thereby calculating the position signal N2. In FIG. 6B, expressions for standardizing the difference of amplitude with the ISG amplitude, respectively, are also described. To realize this function, the servo decoder block controls the AGC so as to fix the amplitude of the ISG part 40. For the servo area 53 whose sector number is 1, the final position signal N is generated by multiplying the position signal N1 by ⅛ density and multiplying the position signal N1 by ⅞ density, then adding both results. In the expression shown in FIG. 6B, 1.0 is equal to 0xFFFF.

In the same way, the CPU standardizes the difference of amplitude between C1 burst 55-3 and D1 burst 55-4 of the burst part 52 with the ISG amplitude, thereby calculating the position signal Q1 and standardizes the difference of amplitude between C2 burst 56-3 and D2 burst 56-4 of the burst part 54 with the ISG amplitude, thereby calculating the position signal Q2. The position signal Q is also generated from both position signals Q1 and Q2 just like the position signal N. The description of the position signal Q is thus omitted in FIG. 6B. The density of each of the position signals N1 and N2, as well as the density of each of the position signals Q1 and Q2 are varied by each sector number to be described later.

Next, how to write servo patterns as shown in FIG. 5 will be described. A manufacturing device referred to as a servo track writer is used to write servo patterns in a manufacturing process in a subject factory. The servo track writer uses such mechanisms as a spindle motor for rotating the magnetic disk 12 and a rotary actuator 13 for moving the head 11 in the radial direction of the magnetic disk 12. Those devices are built in the subject magnetic disk drive itself to be delivered. The servo track writer also uses a reference head referred to as a clock head, and a laser interferometer measurement system, etc., which are not employed as components of the magnetic disk drive to be delivered. The controller of the servo track writer generates a clock signal synchronized accurately with the rotation of the magnetic disk drive 12 from the reference head and sends a servo pattern write signal to the head 11 synchronously with this clock signal. The servo pattern write signal differs among tracks 16. At this time, the laser interferometer measurement system measures the distance to a laser reflection mirror attached to part of the rotary actuator accurately, thereby feeding the distance back to the radial direction of the head 11 so as to control the head 11.

Figure 7A:
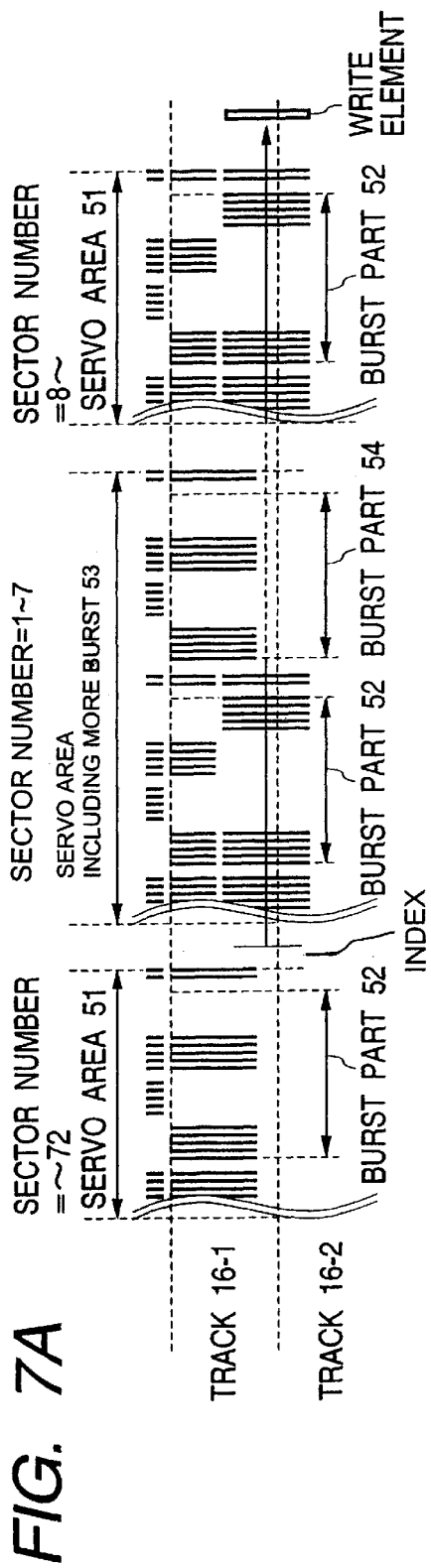

FIG. 7A shows how writing of servo patterns for the lower half of the track 16-1 according to the present invention is started in a servo area whose sector number is 1, then the magnetic disk is rotated by about a half revolution. Usually, the write element core width is wider than the width of a half of the track pitch, so the servo pattern of the previously written adjacent track is erased from one side so as to be adjusted to the target width while writing those servo patterns. Servo patterns of the burst part 52 are thus written in the servo areas whose sector numbers are 1 to 7, then servo patterns of the burst part 52 are written in the subsequent servo areas whose sector numbers are 8 and after. At this time, the write current to be applied to the head 11 is set to 0 in the servo area so as to prevent writing of servo patterns in a range equivalent to the burst part 54. To realize this function, the write gate signal of the pre-amplifier IC for driving head 11 is turned off during the burst part 54. In the servo areas whose sector numbers are 8 to 72, servo patterns are written in the servo area 51 just like the conventional technique.

Figure 7B:
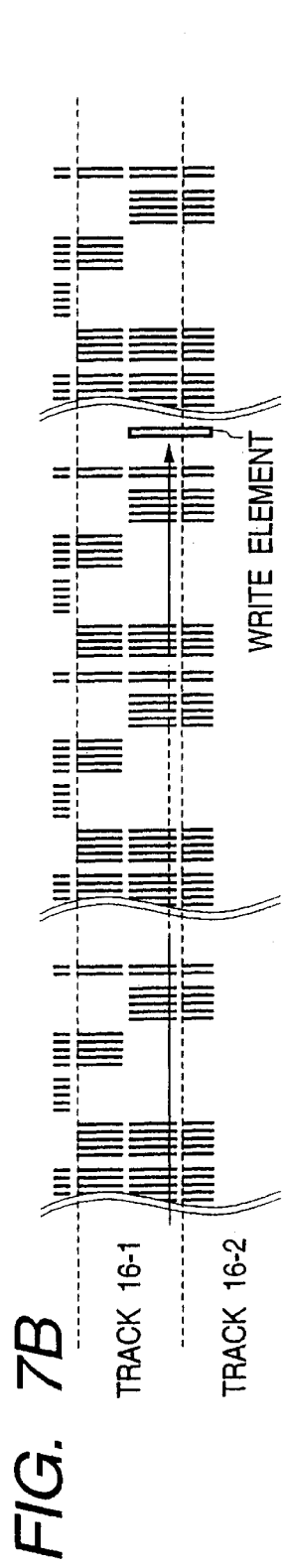

FIG. 7B shows how the magnetic disk 11 is further rotated, so that the write element passes over the servo areas whose sector numbers are 1 to 7 in the lower half of the track 16-1 again. In this stage, a servo pattern is written in the burst part 54 in the servo area 53. When the head 11 passes over the already-written burst part 52, the write current to be applied to the head 11 is set to 0 so as to prevent writing of a burst pattern in the range equivalent to the already-written burst area 52.

Figure 7C:
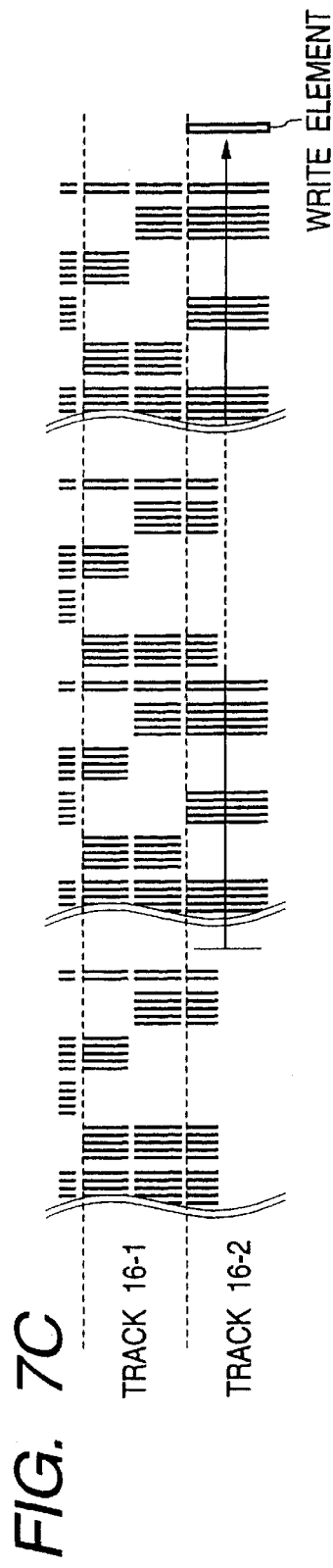

After the writing of a burst pattern in the burst part whose sector number is 7 has ended, the head 11 is moved by a half of the track pitch in the radial direction for the writing in the next burst part. FIGS. 7C and 7D show how writing of servo patterns is started in the servo area whose sector number is 1. FIG. 7E shows the burst parts 52 and 54 in the servo area 53 after the magnetic disk is rotated several times. In those burst parts 52 and 54, the width of both servo patterns is adjusted to that of the track pitch. The above operations are repeated from the extreme outer circuit to the extreme inner circuit of the magnetic disk 12, thereby completing servo areas all over the disk surface.

The head 11 can be moved in the radial direction of the magnetic disk 12 between the end of writing in the burst part 54 whose sector number is 7 and the start of writing in the sector number 1 next time after the magnetic disk 12 is rotated about once. This time interval is equivalent to a time for the rotation of the magnetic disk 12 by a distance of 72−7=65 sectors. It is 15 ms×65/72=13.5 ms if the magnetic disk is rotated at 4000 RPM. This is enough to move the head 11 by a half of the track pitch, so that servo patterns can be written in one track according to the present invention while the magnetic disk 12 is rotated twice. This is the same time as that required for writing conventional servo patterns. For the conventional servo patterns, the head 11 can be moved more quickly than one rotation of the magnetic disk 12, but the time must be long enough to rotate the magnetic disk 12 once for the servo pattern of the present invention.

Figure 8A:
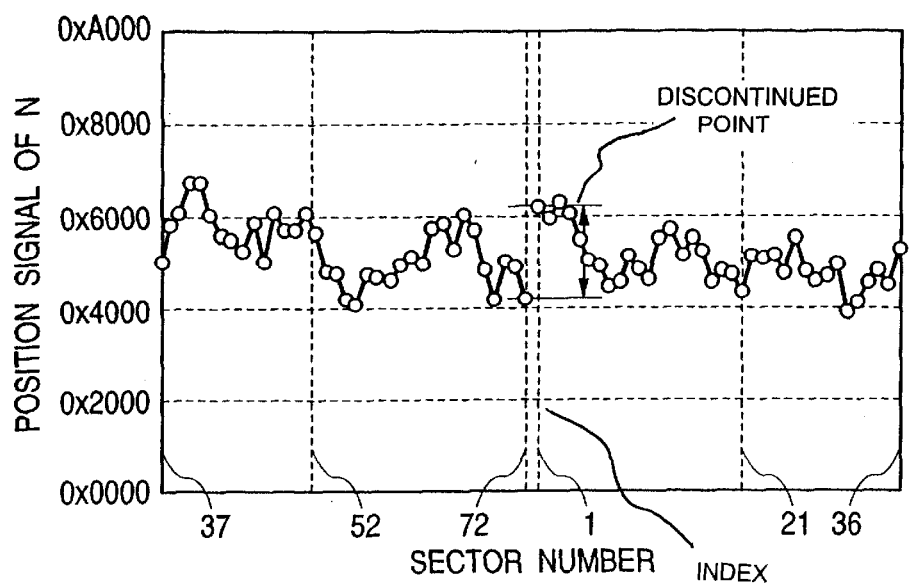
FIGS. 8A and 8B are graphs showing a position signal calculated from a plurality of position signals through an averaging processing.

Next, a description will be made for compensation of an discontinuity to occur at a knot in a servo pattern with use of the servo pattern of the present invention. FIG. 8A shows the position signals N1 decoded from servo areas equivalent to one circuit of the magnetic disk 12. The position signals N1 are decoded from the burst parts 52.

Because writing of servo patterns is started at sector number 1, a discontinuity occurs between sectors 7 and 1 shown in the center in FIG. 8A, where the position signals do not match. The position signals N1 in FIG. 8A are the same as the position signals N decoded from conventional servo patterns.

Figure 8B:
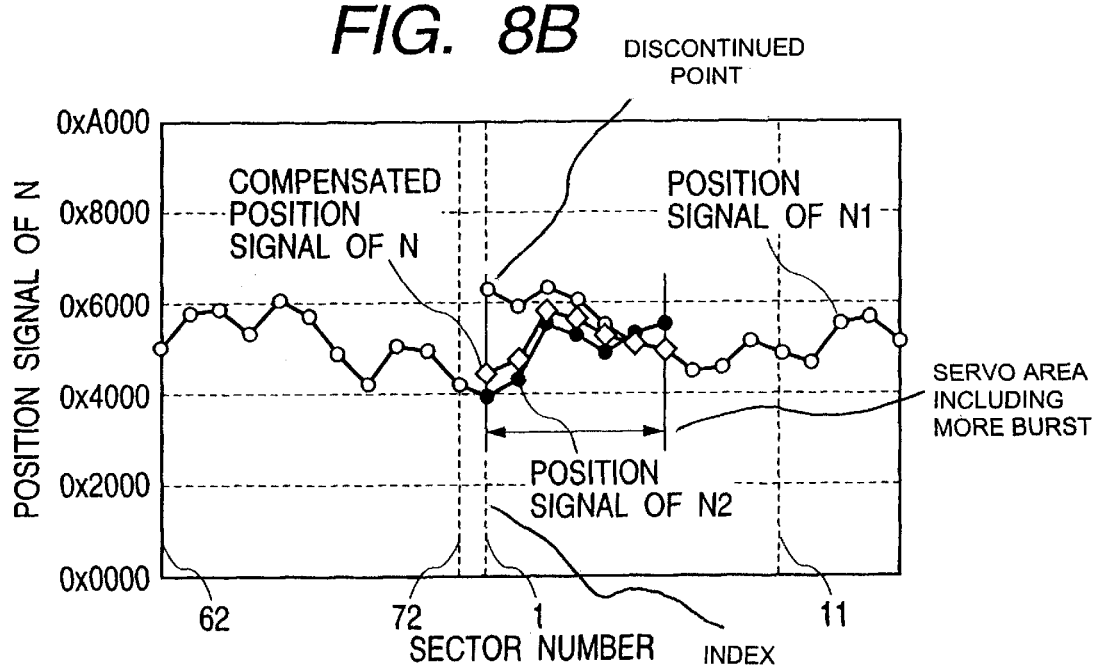
Figure 8C:
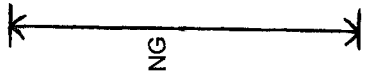
FIG. 8C is a table of position signal values.

In FIG. 8B, the position signals N2 are shown together with the position signals N1. For the servo patterns in this embodiment, both burst part 52 and second burst part 54 are formed in the servo areas whose sector numbers are 1 to 7. Consequently, both of the position signals N1 and N2 are decoded from this range of servo areas between sector numbers 1 and 7. In this embodiment, the compensatory coefficient N1 for sector number 1 is set to ⅛ and the compensatory coefficient N2 for the same sector number is set to ⅞ respectively. Because the position signal N1 for sector number 1 is 0x657F and the position signal N2 for the same sector number is 0x3F27, each position signal is multiplied by its compensatory coefficient and the results are added up so as to calculate the compensated position signal N as 0x4416. FIGS. 8B and 8C show values of both the position signal and the compensated position signal in each of sectors whose numbers are 2 to 7. The position signal N represented as a black circle in those figures is connected to the position signal N1, thereby the discontinuity of the position signal can be reduced before and after sector number 1. The description for both of the position signals Q1 and Q2 is omitted here.

As described above, according to the present invention, it is possible to compensate a knot in a servo pattern which occurs during writing of servo patterns only by writing the additional burst part 54 in some servo areas. According to the present invention, it is only in the burst part 54 that the number of servo patterns is increased. There is no need to duplicate any of the gap part, the ISG part, the Gray code part, etc. Because a normal magnetic disk drive sets a rate of one servo area that occupies the area of the magnetic disk to 0.1% or under, the formatting efficiency is not lowered so much even if the servo pattern of the present invention is employed.

The servo pattern in this embodiment can obtain both of the position signals N1 and N2 in seven consecutive servo areas. In this embodiment, therefore, the compensatory coefficient is varied in seven steps from ⅛ to ⅞. Because the denominator of the compensatory coefficient is the square of 2, it is possible to process a compensatory calculation of a position signal fast by means of a right bit shift operation and an addition. The number of servo areas 53 having the burst part 54 respectively is selected suitably for the compensatory operation, thereby minimizing the degradation of the object servo loop band.

Figure 9:
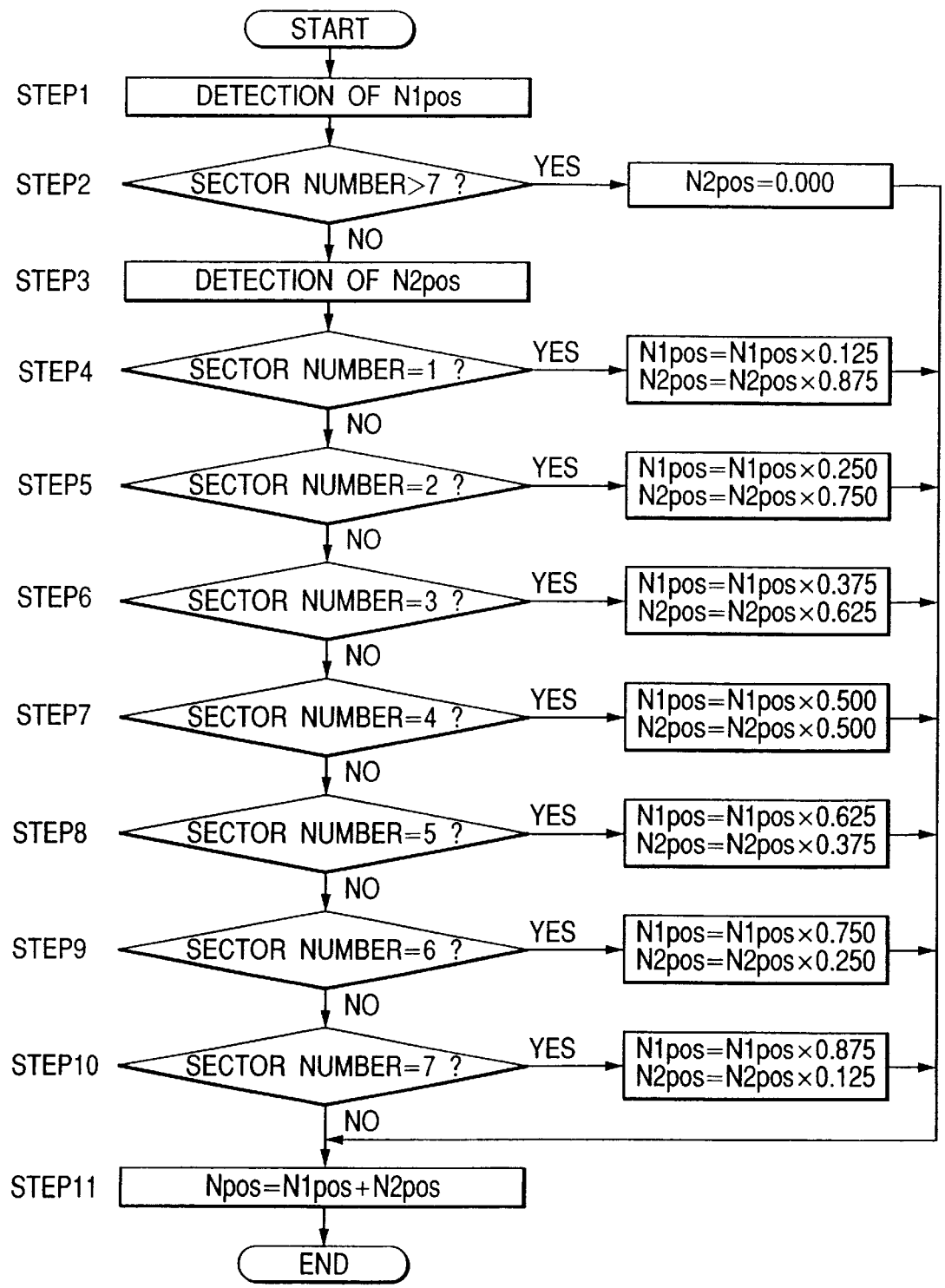
FIG. 9 is a flow chart of a process of detecting the position signals from each servo pattern of the present invention.

Next, how to execute a compensatory operation according to the present invention will be described with reference to the flowchart in FIG. 9. At first, in step 1, both position signals N1 and Q1 are detected. The process related to the position signal Q is omitted in FIG. 9. Nothing will be described specially for the calculation of the position signal Q, but the operation can be carried out with both position signals Q1 and Q2 just like the operation of the position signal N. In step 2, the present sector number is referenced so as to determine whether or not the object servo area is the servo area 53 having the second burst part 54.

In this embodiment, a sector number is referenced so as to determine the type of the object servo area through a comparative operation. However, if a specific pattern is formed before the burst part 54, the calculation time can be much reduced. For example, if the servo address mark of the servo area 53 having the burst part 54 is varied from that of other servo areas having no burst part 54, the existence of the burst part 54 can be detected by a circuit. In addition, if a specific pattern that is different from an address mark is disposed at a place where the burst part 52 is separated from the burst part 54, the existence of the burst part 54 can also be detected by a circuit.

If a burst part 54 exists, the position signal N2 is detected from the burst part 54 in step 3. If no burst part 54 exists, the value of the position signal N2 is set to 0. In steps 4 to 10, an averaging processing that differs among sector numbers is assigned to the preprocessing. For example, if the sector number is 1, the value of the position signal N1 is reduced to ⅛ and the value of the position signal N2 is reduced to ⅞ in step 4. For example, the position signal N1 is shifted to the right by 3 bits. Then, the position signal N2 is shifted to the right by 3 bits and a complementary value of the result is added to the position signal N2, thereby executing this processing. Even in steps 5 to 10, a right bit shift operation and an addition can be combined as described above so as to execute such a calculation. In this embodiment, sector numbers are compared with each other as described in the flowchart in FIG. 9, but the calculation can be speeded up more by a branch operation with use of the address table. Finally, both of the position signals N1 and N2 that are weighted respectively are added up in step 11 so as to obtain a compensated position signal N.

Figure 10:
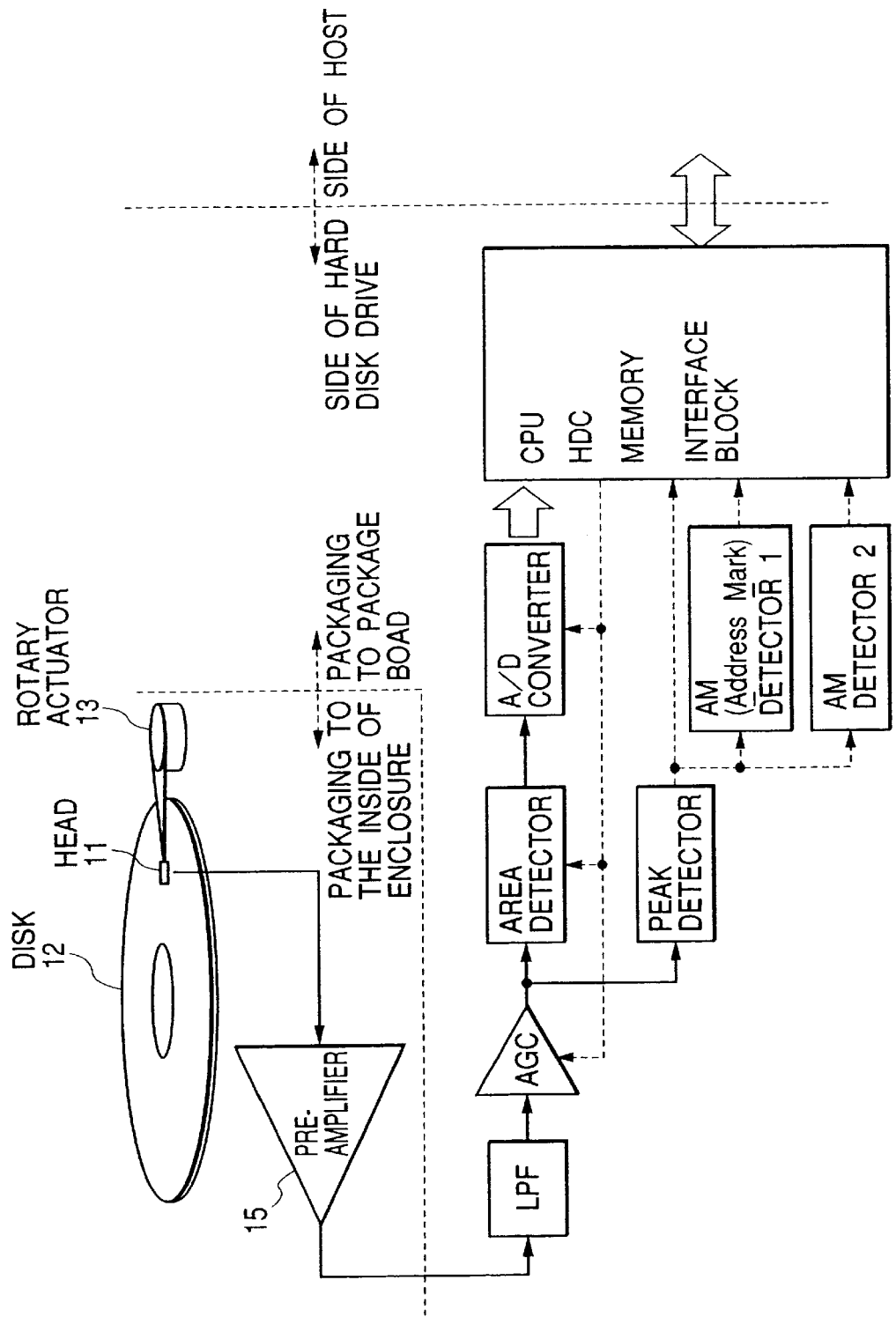
FIG. 10 is a block diagram of a circuit for detecting the servo pattern of the present invention.

FIG. 10 is a block diagram of a decoder block for detecting a position signal from a servo pattern according to the present invention. To simplify the decoder block, a second address mark detector (AM detector) 2 is just added to a conventional servo decoder block so as to obtain this decoder block. A reproduced signal output from the head 11 is amplified to 100 to 200 times in the pre-amplifier 15, then its high frequency component noise is removed in a low-path filter. An auto gain controller (AGC) adjusts the amplitude of the reproduced waveform so as to fix the amplitude of the ISG part 40 shown in FIG. 6. If the address mark detector (AM detector) 1 or the address mark detector (AM detector) 2 detects the AM part from a signal converted from a reproduced waveform to a digital waveform by the peak detector, the AGC is turned off so as to fix the amplified gain, thereby reducing the influence of the magnetic characteristics and uneven flying height of the magnetic disk.

The AM detector 1 detects the address mark included in the servo area 51 and the AM detector 2 detects the address mark included in the servo area 53. The A/D converter converts an amplitude value of a pattern detected by an integrator to a digital value. This digital value is then transferred to the CPU and used for compensatory calculation of each position signal. The hard disk controller (HDC) controls the timings of the AGC, the integrator, and the A/D converter.

Figure 11:
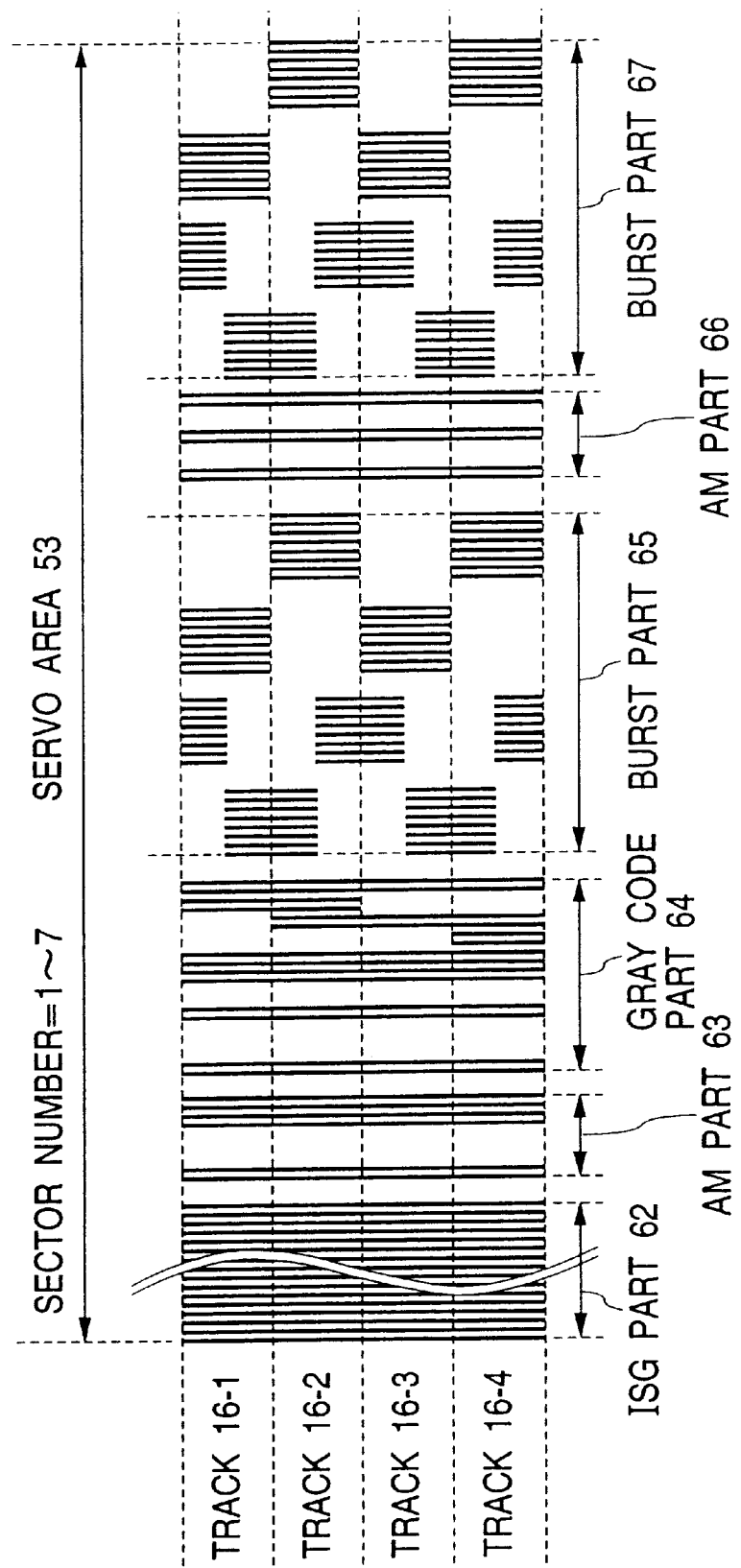
FIG. 11 is a diagram showing another example of the servo pattern of the present invention.

FIG. 11 shows an example of the servo pattern of the present invention. The servo pattern shown in FIG. 11 has an AM part 66 used to start synchronization between two burst parts 65 and 67 of the servo area 53 so as to detect each bit of the burst part 67. The AM detector 1 can be used exclusively to detect the AM part 63 and the AM detector 2 can be used exclusively to detect the AM part 66. Consequently, the start of the burst part can be referenced more accurately, thereby reducing the margin of the timing of the control signal used for A/D conversion.

More specifically, the formatting efficiency of the whole disk drive can be improved if the gap area formed between the burst parts 65 and 67, as well as the gap formed between burst patterns A to D in the burst part 67 are reduced in length respectively.

Figure 12A:
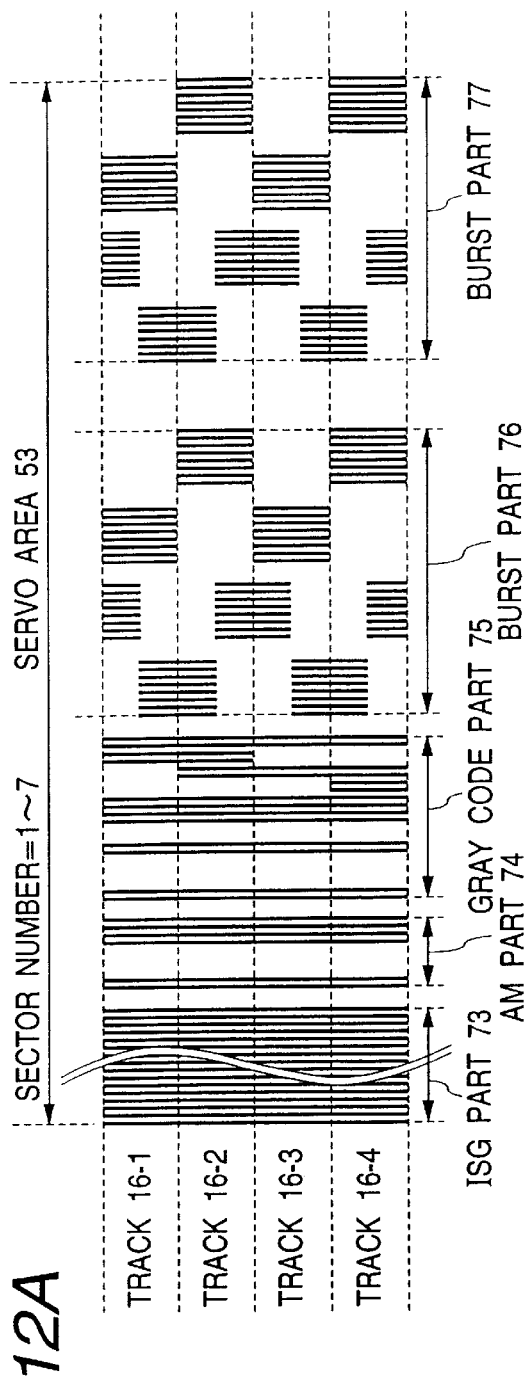
FIGS. 12A and 12B are diagrams showing still another example of the servo pattern of the present invention.
Figure 12B:
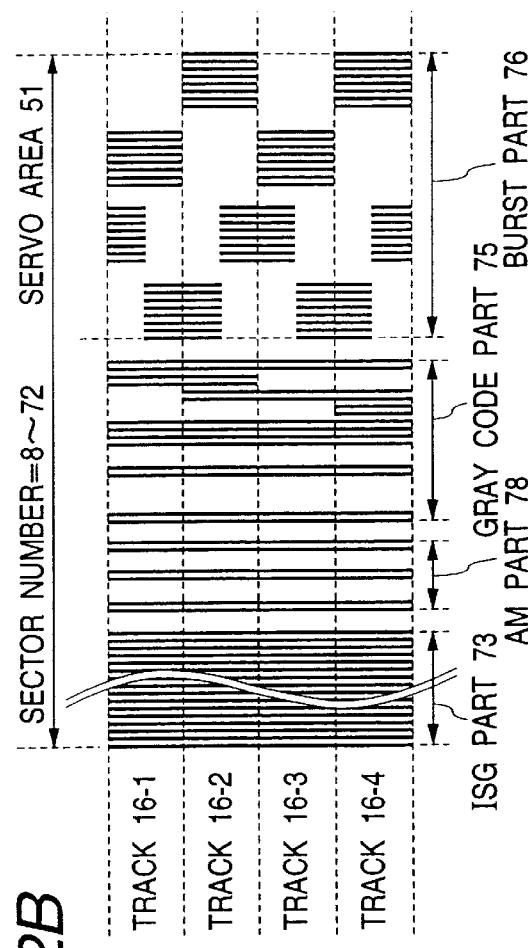
Figure 14A:
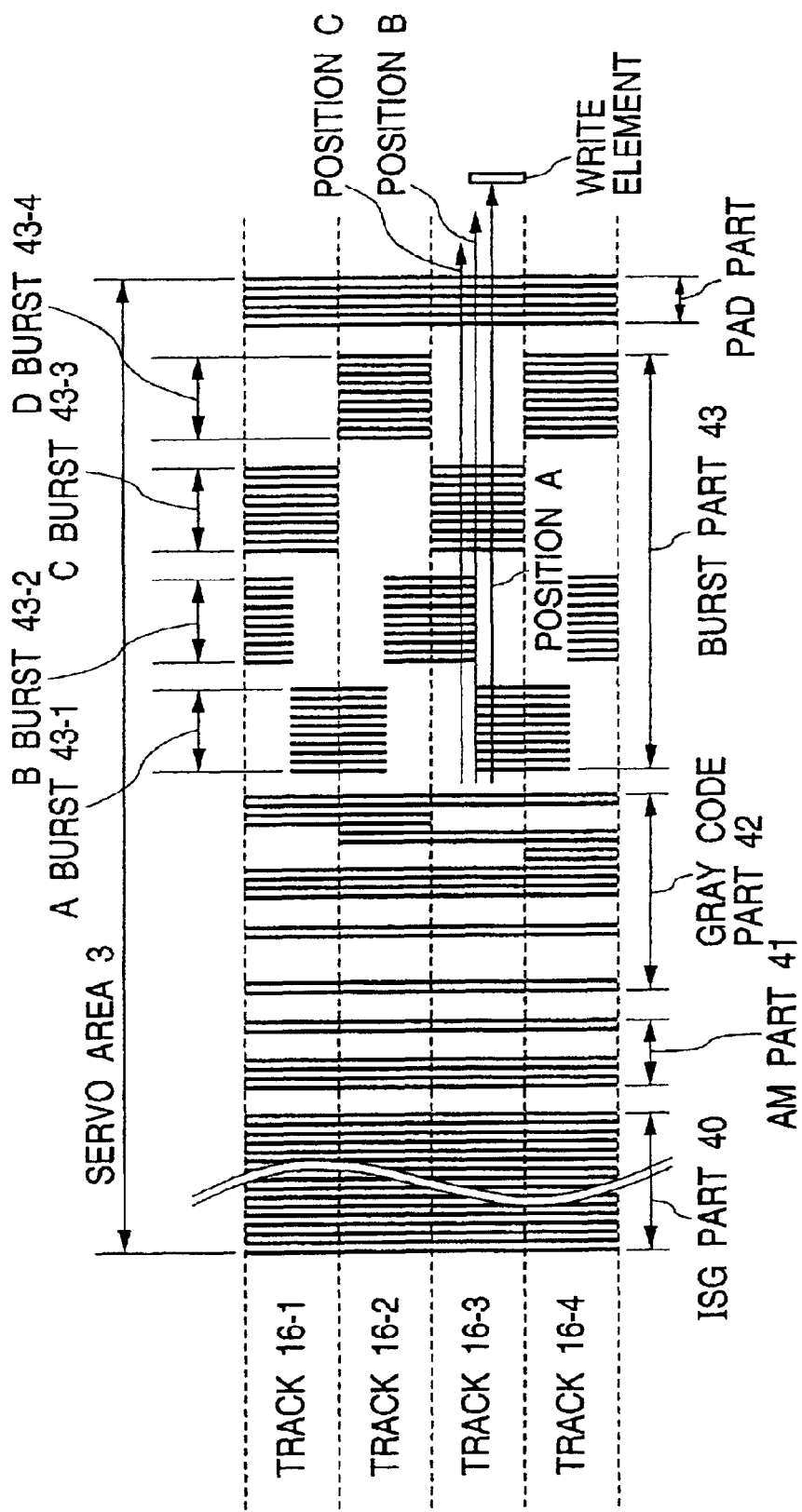
FIG. 14A is a diagram which shows an example of a convention servo pattern.
Figure 14B:
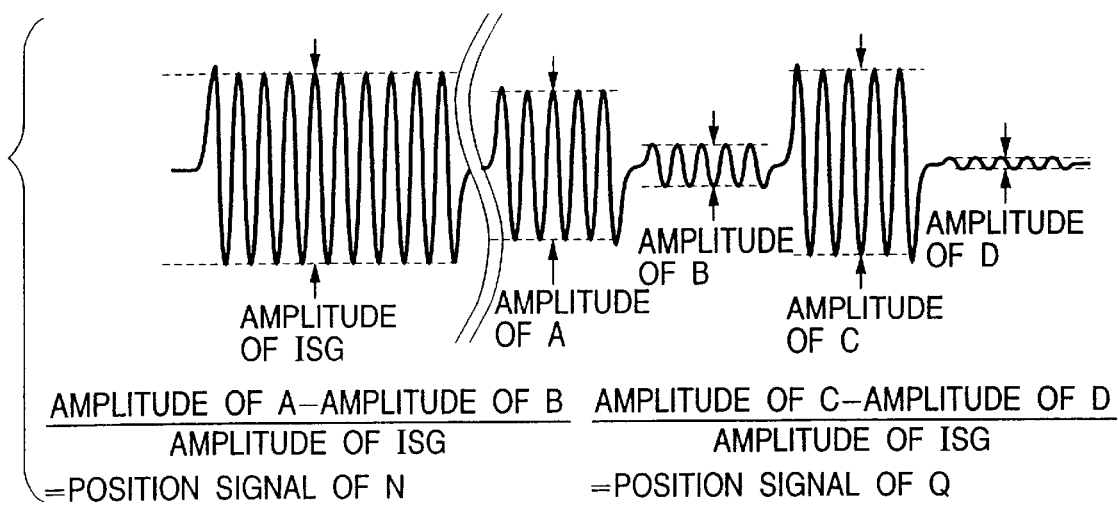
FIG. 14B is a diagram of a position signal calculated from a reproduced waveform of the conventional servo pattern.
Figure 14C:
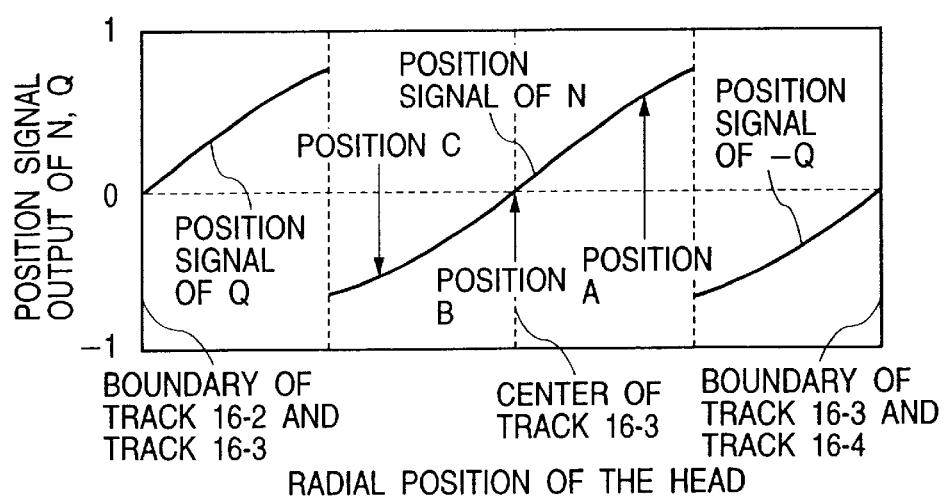
FIG. 14C is a diagram showing values of position signals for various radial positions of the head.

FIGS. 12A and 12B show another example of the servo pattern of the present invention. This servo pattern has an AM part 74 and an AM part 78 that are varied between the servo area including two burst parts 76 and 77 and the servo area including one burst part 76. In this case, the AM detector 1 is used exclusively to detect the AM part 74 of each servo area 53 shown in FIG. 12A, and the AM detector 2 is used exclusively to detect the AM part 78 of each servo area 51 shown in FIG. 12B. Consequently, it is possible to distinguish between the servo areas 53 and 51 surely only by referencing the output of the subject AM detector, thereby the HDC circuit configuration can be simplified.

According to the present invention, therefore, it is possible to reduce the discontinuous error component of the position signal to be caused by the vibration of the servo track writer. Consequently, it is possible to improve the accuracy of head positioning and to surely detect a fluctuation of the position error signal caused by an external shock, thereby inhibiting the subsequent write operations. As a result, it is possible to improve the data track density in the radial direction so as to improve the storing capacity, thereby a magnetic disk drive having excellent external shock resistivity can be provided.

What is claimed is:

1. A magnetic disk drive, comprising:

a magnetic disk having a plurality of data areas separated in a plurality of tracks in a radial direction, and a plurality of servo areas separated in a circumferential direction thereon; and a servo decoder block for decoding a head position signal from each of the plurality of servo areas;

wherein said magnetic disk has a discontinued point formed once per round at an index, which includes a servo area having more burst areas than other servo areas, and wherein said servo area having more burst areas than other servo areas includes a burst part written by a servo track writer at the n-th rotation of said magnetic disk (n: a positive integer) and a burst part written by the servo track writer at the (n+1)-th rotation of said magnetic disk respectively.

2. The magnetic disk drive according to claim 1, wherein the burst part of said servo area includes more bursts than other servo areas, and is separated into a plurality of groups by a pattern that is distinct from a servo address mark.

3. The magnetic disk drive according to claim 1, wherein said servo area has a servo address mark whose pattern is varied according to a number of bursts included therein.

4. The magnetic disk drive according to claim 1, wherein a number of servo areas including more burst parts than other servo areas respectively is a value obtained by subtracting 1 from the square of 2.

5. The magnetic disk drive according to claim 1, wherein said servo decoder block, when decoding a head position signal from a servo area having more burst parts than other servo areas, averages a plurality of position signals decoded from said burst parts included in said servo area.

6. A magnetic disk drive according to claim 1, wherein said servo decoder block is configured to connect a head position signal with another head position at each knot in a servo pattern, said discontinued point occurring once at every round of writing said servo patterns by a servo track writer.

7. A magnetic disk drive according to claim 1, wherein said discontinued point in a servo pattern is formed between the start of a written servo area and the end of another written servo area.

8. A magnetic disk drive, comprising:

a head having a write element and a reproduce element;

a magnetic disk having a plurality of tracks and a plurality of servo areas formed thereon, each of said servo areas including a burst pattern for determining a center of each of said tracks formed concentrically on said magnetic disk; and a servo decoding block for generating a signal representing a positional relationship between the center of each track and said head according to a signal of said burst pattern reproduced by said head;

wherein each of said servo areas has a burst pattern that is different from others in the circumferential direction;

wherein said magnetic disk has a discontinued point formed once per round at an index, which includes a servo area having more burst areas than other servo areas; and wherein said servo area having more burst areas than other servo areas includes a burst part written by a servo track writer at the n-th rotation of said magnetic disk (n: a positive integer) and a burst part written by the servo track writer at the (n+1)-th rotation of said magnetic disk respectively.

9. The magnetic disk drive according to claim 8, wherein said plurality of servo areas are divided into two types, one type written with only one burst pattern for determining the center of each track in the circumferential direction and the other type written with two burst patterns for determining the center of each track in the circumferential direction.

10. The magnetic disk drive according to claim 8, wherein servo areas having more burst patterns than other servo areas respectively in the circumferential direction are adjacent to each other in the radial direction.

11. A magnetic disk drive according to claim 8, wherein said discontinued point in a servo pattern is formed between the start of a written servo area and the end of another written servo area.

12. A disk drive, comprising:

a head having a read element and a write element;

a disk having a plurality of tracks and a plurality of servo areas disposed between data segments of consecutive tracks, each servo area having a servo pattern of one or more burst parts used by the head to determine a center of each track; and a servo decoding block for decoding head position signals representing a positional relationship between the center of each track and the head from the servo patterns from the servo areas read by the head;

wherein the servo area having the servo pattern of more burst parts than other servo areas includes a burst part written by a servo track writer at the n-th rotation of the disk (n: a positive integer) and a burst part written by the servo track writer at the (n+1)-th rotation of the disk respectively.

13. The disk drive according to claim 12, wherein the servo areas have two type of servo patterns, in which one type of servo patterns is written with only one burst part indicating one set of burst patterns written in a circumferential direction of the disk for determining the center of each track in the circumferential direction of the disk, and another type of servo patterns is written with two burst parts indicating two sets of burst patterns written in the circumferential direction of the disk for determining the center of each track in the circumferential direction of the disk.

14. The disk drive according to claim 12, wherein the servo decoder block, after decoding the head position signals from servo areas including more burst parts than other servo areas, averages the head position signals decoded from the burst parts in each servo area so as to connect the head position signals smoothly at each discontinued point formed once per round at an index in a servo pattern between the start of a written servo area and the end of another written servo area.

* * * * *